US009379409B2

(12) United States Patent
Matsui et al.

(10) Patent No.: US 9,379,409 B2
(45) Date of Patent: Jun. 28, 2016

(54) SEALED SECONDARY BATTERY AND MANUFACTURING APPARATUS AND MANUFACTURING METHOD THEREFOR

(75) Inventors: Tomohiro Matsui, Kitakyushu (JP); Kenta Fukatsu, Fujisawa (JP); Hirokazu Okamoto, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1029 days.

(21) Appl. No.: 13/224,712

(22) Filed: Sep. 2, 2011

(65) Prior Publication Data

US 2012/0070723 A1    Mar. 22, 2012

(30) Foreign Application Priority Data

Sep. 21, 2010    (JP) ................. 2010-211380

(51) Int. Cl.
| | | |
|---|---|---|
| *H01M 10/04* | (2006.01) | |
| *H01M 10/12* | (2006.01) | |
| *H01M 2/08* | (2006.01) | |
| *H01M 10/34* | (2006.01) | |
| *H01M 2/36* | (2006.01) | |

(52) U.S. Cl.
CPC ............ *H01M 10/0404* (2013.01); *H01M 2/08* (2013.01); *H01M 2/365* (2013.01); *H01M 10/121* (2013.01); *H01M 10/34* (2013.01); *H01M 2/361* (2013.01); *Y02E 60/126* (2013.01); *Y02P 70/54* (2015.11)

(58) Field of Classification Search
CPC ..................................... H01M 10/04–10/4207
See application file for complete search history.

(56) References Cited

U.S. PATENT DOCUMENTS

| 4,979,181 A | 12/1990 | Nakanose et al. | |
|---|---|---|---|
| 2006/0257733 A1* | 11/2006 | Kim et al. .................... | 429/185 |

FOREIGN PATENT DOCUMENTS

| JP | 62-77456 | 4/1987 | |
|---|---|---|---|
| JP | 2-290690 | 11/1990 | |
| JP | 09-199110 | * 7/1997 | ............. H01M 2/36 |
| JP | 2000-268811 | 9/2000 | |
| JP | 2001-57207 | 2/2001 | |
| JP | 2001-68073 | 3/2001 | |
| JP | 2001-256965 | 9/2001 | |

(Continued)

OTHER PUBLICATIONS

Machine Translation of JP 09-199110 (Jul. 1997).*

(Continued)

*Primary Examiner* — Jonathan Crepeau
*Assistant Examiner* — Jacob Buchanan
(74) *Attorney, Agent, or Firm* — Oblon, McClelland, Maier & Neustadt, L.L.P.

(57) ABSTRACT

According to one embodiment, a manufacturing apparatus for a sealed secondary battery includes a chamber, pressure reduction unit, sealer transfer unit, and welding unit. The chamber accommodates therein a battery container injected with an electrolyte through an injection hole and is hermetically closed. The pressure reduction unit reduces pressure inside the chamber. The sealer transfer unit is configured to mount a sealer for sealing the injection hole on the injection hole of the battery container in the chamber decompressed by the pressure reduction unit. The welding unit is configured to laser-weld the sealer to the battery container by applying a laser beam to the peripheral edge portion of the sealer on the battery container through a laser transmission window formed in one surface of the chamber.

4 Claims, 12 Drawing Sheets

(56) References Cited

FOREIGN PATENT DOCUMENTS

| | | |
|---|---|---|
| JP | 2003-86240 | 3/2003 |
| JP | 2004-259584 | 9/2004 |
| JP | 2007-18915 | 1/2007 |
| JP | 2007-317577 | 12/2007 |
| JP | 4111621 | 4/2008 |
| JP | 2009-199819 | 9/2009 |
| JP | 2010-80116 | 4/2010 |
| JP | 2010-86776 | 4/2010 |
| JP | 2012-69288 | 4/2012 |

OTHER PUBLICATIONS

Machine Translation of JP 2001-068073 (Mar. 2001).*
Machine Translation of JP 2001-256965 (Sep. 2001).*
Machine Translation of JP 2003-086240 (Mar. 2003).*
Japanese Office Action issued Aug. 21, 2012, in Japan Patent Application No. 2010-211380 (with English translation).
Combined Chinese Office Action and Search Report issued Oct. 18, 2013 in Patent Application No. 201110223444.8 (with English language translation).

* cited by examiner

SEALED SECONDARY BATTERY AND MANUFACTURING APPARATUS AND MANUFACTURING METHOD THEREFOR

CROSS-REFERENCE TO RELATED APPLICATIONS

This application is based upon and claims the benefit of priority from prior Japanese Patent Application No. 2010-211380, filed Sep. 21, 2010, the entire contents of which are incorporated herein by reference.

FIELD

Embodiments described herein relate generally to a sealed secondary battery and a manufacturing apparatus and a manufacturing method therefor.

BACKGROUND

In recent years, sealed secondary batteries each in the form of a flat rectangular box have become widely used in portable electronic apparatuses and the like. In one such secondary battery, a battery container normally comprises an open-topped metallic container body and metallic sealing plate. The container body is in the form of a flat rectangular box. The sealing plate is welded to the container body so that it closes an opening of the container body. Battery elements are arranged in the container body before the sealing plate is welded to the container body. Thereafter, the sealing plate is welded to the container body to form the sealed battery container. Then, an electrolyte is injected into the container body through an injection hole formed in the sealing plate. When the injection of the electrolyte is finished, the injection hole is sealed with a sealer in a reduced-pressure ambience.

DETAILED DESCRIPTION

In general, according to one embodiment, a manufacturing apparatus for a sealed secondary battery comprises a chamber, pressure reduction unit, sealer transfer unit, and welding unit. The chamber accommodates therein a battery container injected with an electrolyte through an injection hole and is hermetically closed. The pressure reduction unit reduces pressure inside the chamber. The sealer transfer unit is configured to mount a sealer for sealing the injection hole on the injection hole of the battery container in the chamber decompressed by the pressure reduction unit. The welding unit is configured to laser-weld the sealer to the battery container by applying a laser beam to the peripheral edge portion of the sealer on the battery container through a laser transmission window formed in one surface of the chamber.

Embodiments of a sealed secondary battery and an apparatus and method for manufacturing the same will now be described in detail with reference to the accompanying drawings.

First Embodiment

A first embodiment will first be described with reference to FIGS. 1 to 9.

Figure 1:
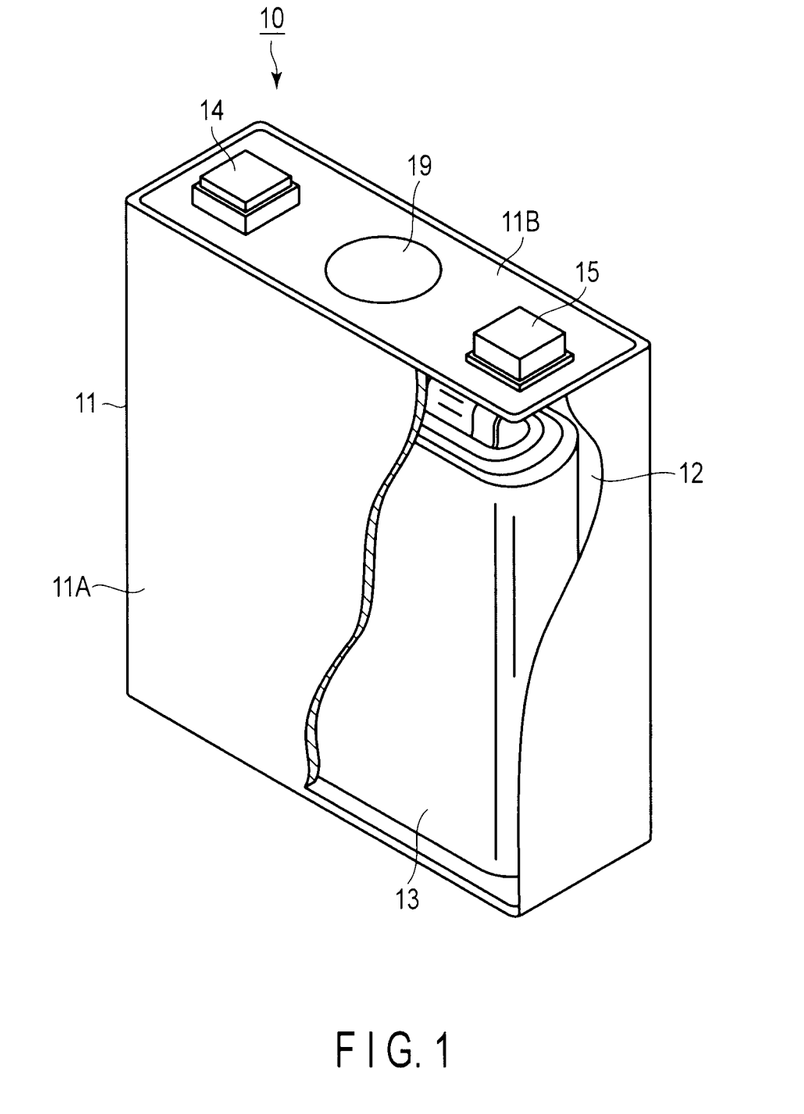
FIG. 1 is a perspective view showing an appearance of a sealed secondary battery according to a first embodiment.
Figure 2:
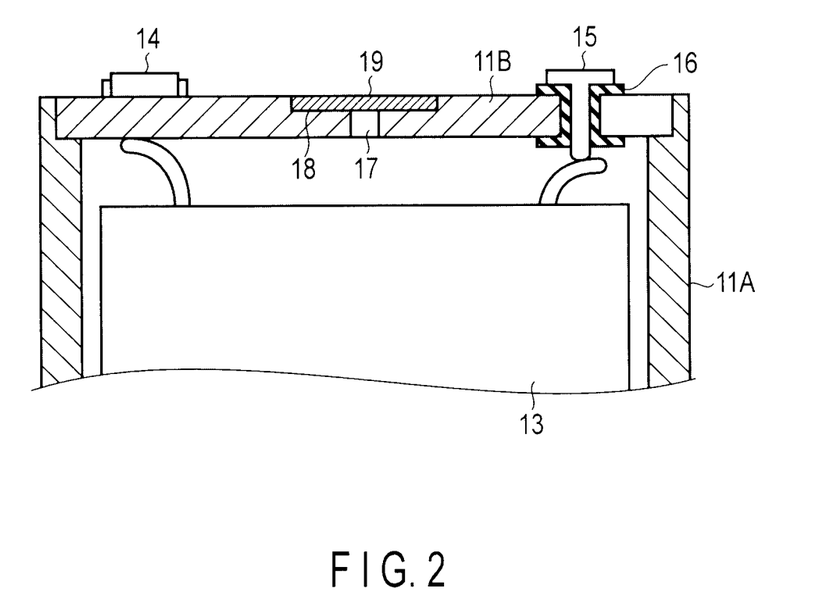
FIG. 2 is a sectional view showing a part of the sealed secondary battery.

FIG. 1 is a perspective view showing an appearance of a sealed secondary battery 10 according to the first embodiment, and FIG. 2 is a sectional view showing a part of the sealed secondary battery 10.

As shown in FIGS. 1 and 2, the sealed secondary battery 10 comprises a battery container 11 of metal, such as aluminum, in the form of a flat box. An electrode assembly 13, along with a non-aqueous electrolyte 12, is accommodated in the battery container 11. The battery container 11 comprises an open-topped container body 11A and rectangular sealing plate 11B, which seals an opening of the container body 11A. The sealing plate 11B is mounted on an end face of the opening of the container body 11A such that it is welded throughout its circumference thereto, thereby sealing the opening. Thus, the container body 11A and sealing plate 11B are integrated without a gap, thereby forming the sealed battery container 11.

A positive electrode terminal 14 and negative electrode terminal 15 are arranged individually on the longitudinally opposite end portions of the sealing plate 11B such that they project from the sealing plate 11B. The positive and negative electrode terminals 14 and 15 are connected to positive and negative electrodes, respectively, of the electrode assembly 13. The electrode assembly 13 is a flat rectangular plate formed by coiling positive and negative electrode plates with a separator sandwiched therebetween and radially compressing the resulting structure.

As shown in FIG. 2, the negative electrode terminal 15 extends penetrating the sealing plate 11B. A seal member, e.g., a gasket 16, of an insulator such as synthetic resin or glass is interposed between the negative electrode terminal 15 and sealing plate 11B. The gasket 16 hermetically seals the negative electrode terminal 15 and sealing plate 11B and electrically insulates them from each other.

An injection hole 17 through which the non-aqueous electrolyte 12 is injected into the battery container 11 is formed penetrating the central part of the sealing plate 11B. The injection hole 17 is, for example, circular. The sealing plate 11B is formed with an annular step portion 18 around the injection hole 17. The step portion 18 is formed by press working or the like.

The injection hole 17 is sealed by a sealer 19 secured to the sealing plate 11B. The sealer 19 is, for example, an aluminum disk, which has a thickness substantially equal to the depth of the step portion 18 of the sealing plate 11B. The sealer 19 has its peripheral edge portion fitted in the step portion 18 and is welded to the sealing plate 11B by laser welding. Thus, the injection hole 17 of the battery container 11 is hermetically sealed by the sealer 19.

A manufacturing apparatus 20 for the sealed secondary battery 10 constructed in this manner will now be described with reference to FIGS. 3 to 5.

Figure 3:
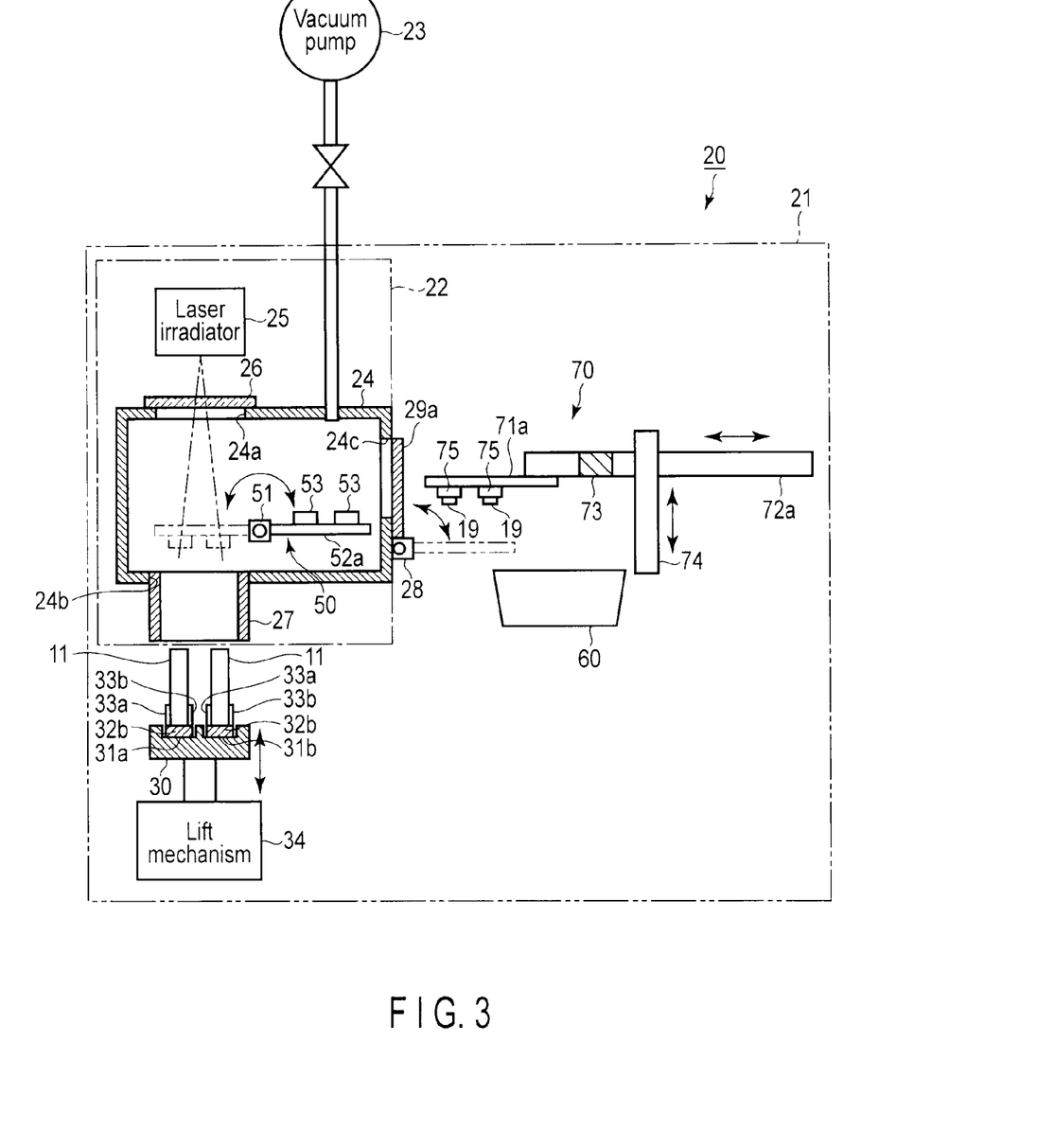
FIG. 3 is a schematic configuration view, partially in section, of a principal part of a manufacturing apparatus according to a first embodiment taken from the front side.
Figure 4:
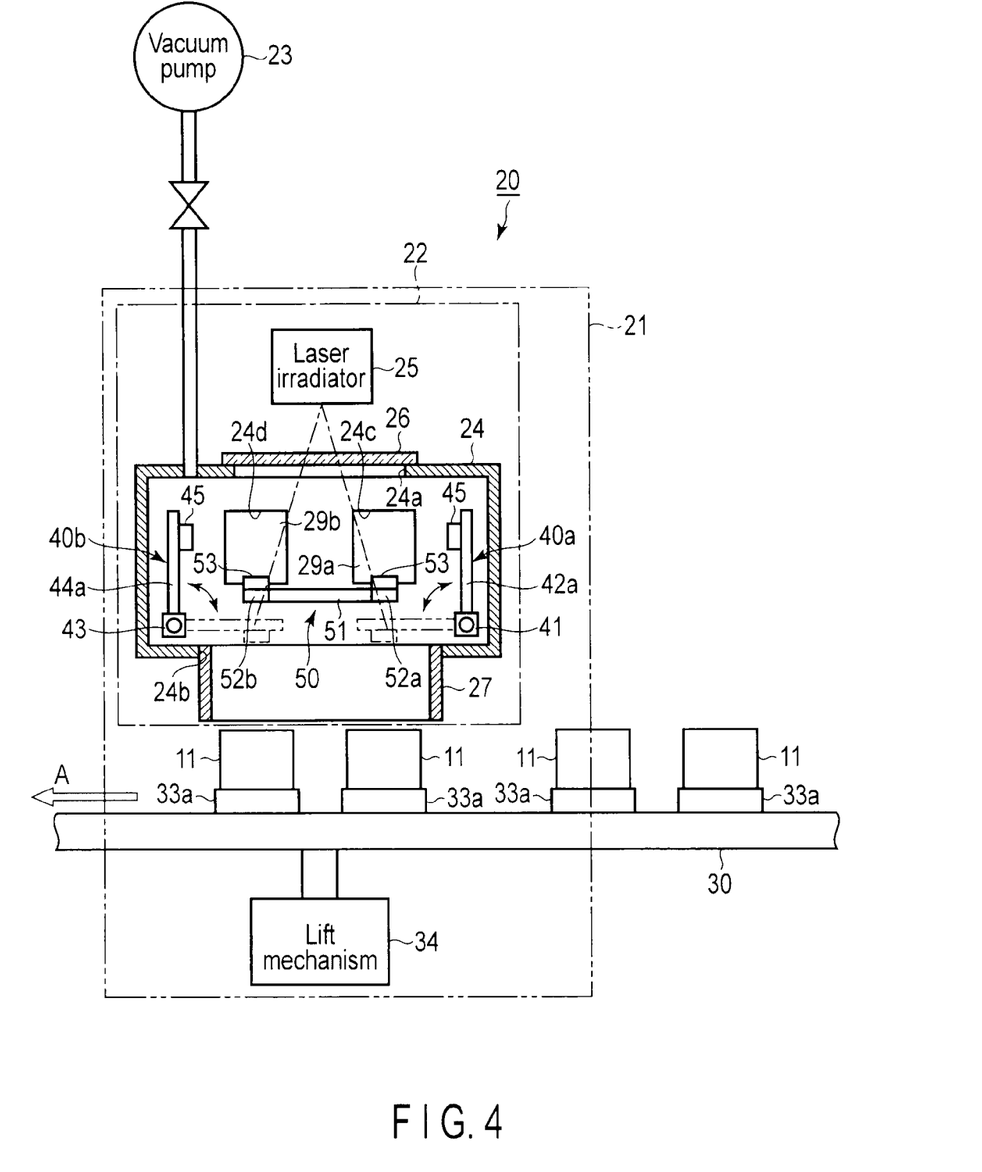
FIG. 4 is a schematic configuration view, partially in section, of the principal part of the manufacturing apparatus taken from the left side.
Figure 5:
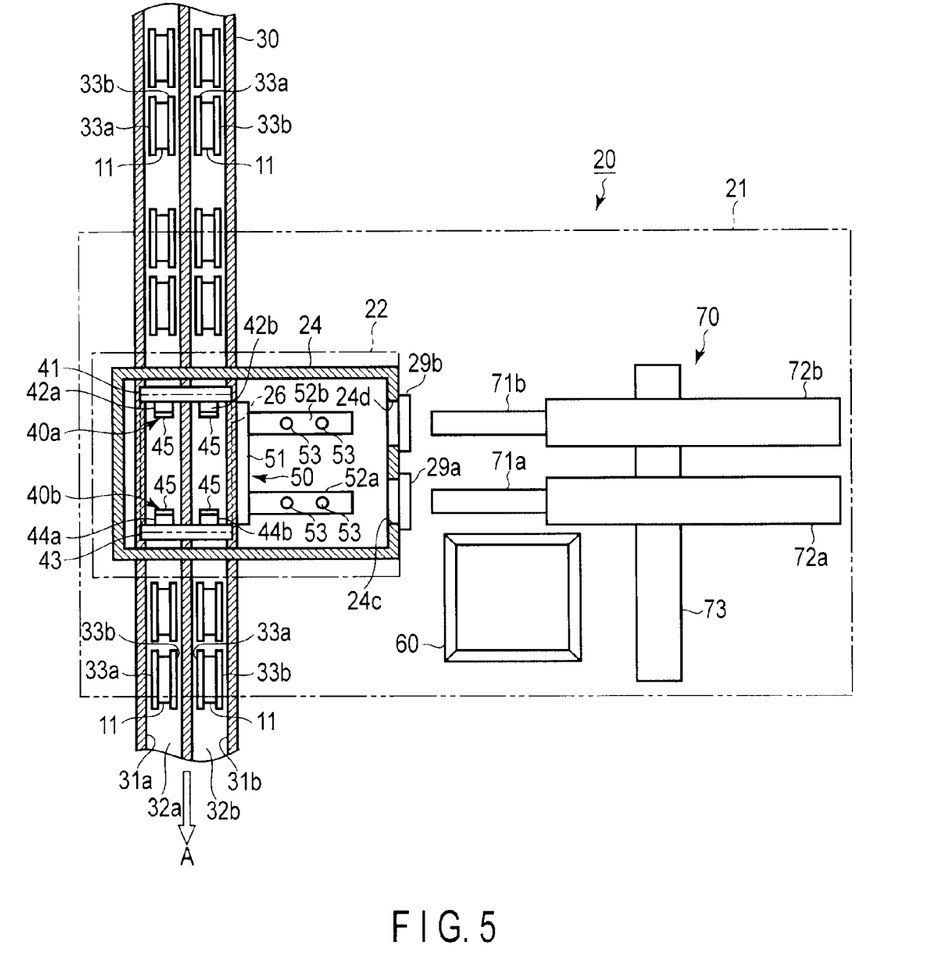
FIG. 5 is a schematic configuration view, partially in section, of the principal part of the manufacturing apparatus taken from the top side.

FIG. 3 is a schematic configuration view, partially in section, of a principal part of the manufacturing apparatus 20 taken from the front side, FIG. 4 is a schematic configuration view, partially in section, of the principal part of the manufacturing apparatus 20 taken from the left side, and FIG. 5 is a schematic configuration view, partially in section, of the principal part of the manufacturing apparatus 20 taken from the top side.

As shown in FIGS. 3 to 5, a body case 21 of the manufacturing apparatus 20 accommodates a laser compartment 22 therein. The laser compartment 22 accommodates a chamber 24, which internally communicates with a vacuum pump 23, and a laser irradiator 25 for use as laser welding unit. The vacuum pump 23 functions as pressure reduction unit that reduces the pressure inside the chamber 24.

The ambience in the body case 21 is dry air with a dew point of, for example, −60° C. or less. Further, the ambience in the laser compartment 22 is an inert gas, such as nitrogen.

A substantially rectangular opening 24a is formed in a ceiling portion of the chamber 24, and it is sealed up by a laser transmission window 26 of glass. The laser irradiator 25 is mounted above the laser transmission window 26. A laser beam emitted from the irradiator 25 is transmitted through the window 26 and used to scan the interior of the chamber 24.

Further, a rectangular opening 24b is formed in a bottom portion of the chamber 24, which is substantially opposed to the opening 24a in the ceiling portion. A tube 27 having a square cross-section is secured to the peripheral edge of the opening 24b. One (upper) opening of the tube 27 communicates with the interior of the chamber 24, and the other (lower) opening with the internal space of the body case 21 that surrounds the laser compartment 22.

Furthermore, two rectangular tool insertion slots 24c and 24d are transversely arranged side by side in the right side surface portion of the chamber 24. A rotary shaft member 28 is supported on a lower part of the outer wall surface of each of the tool insertion slots 24c and 24d such that it extends parallel to the array of the slots 24c and 24d. Two doors 29a and 29b are arranged side by side along the central axis of the rotary shaft member 28. When the doors 29a and 29b are set up along the side surface of the chamber 24, as indicated by a full line in FIG. 3, they hermetically close their corresponding tool insertion slots 24c and 24d. If the rotary shaft member 28 pivots so that the doors 29a and 29b rotate approximately 90°, as indicated by a two-dot chain line in FIG. 3, the tool insertion slots 24c and 24d open. If the slots 24c and 24d open, arms 71a and 71b of a sealer supply tool 70 (described later) are introduced into or removed from the chamber 24 through the slots 24c and 24d.

The body case 21 of the manufacturing apparatus 20 is penetrated by a battery conveyor 30 from the rear side to the front side. The conveyor 30 is positioned just below the tube 27, lying below the bottom surface portion of the chamber 24.

Two recessed grooves 31a and 31b are formed parallel to each other on the conveyor 30 such that they extend longitudinally relative to the conveyor. Conveyor belts 32a and 32b are laid individually on the respective bottom portions of the recessed grooves 31a and 31b. The respective conveying surfaces of the conveyor belts 32a and 32b are substantially flush with the top surface of the conveyor 30.

Further, a pair of container support plates 33a and 33b are set up individually on the opposite edge portions of the conveying surface of each of the conveyor belts 32a and 32b such that they are opposed to each other with a predetermined space therebetween in the direction of conveyance. The length of each of the container support plates 33a and 33b in the direction of conveyance is substantially equal to the longitudinal dimension of the battery container 11. The container support plates 33a and 33b hold the lower parts of the opposite side surfaces (extending longitudinally relative to the battery container 11) of the battery container therebetween in such a manner that the battery container stands upright with its sealing plate 11B upward. The conveyor belts 32a and 32b convey a plurality of the battery containers 11, which are individually held by the container support plates 33a and 33b, from the rear side to the front side of the body case 21, as indicated by arrow A in FIGS. 4 and 5.

The conveyor 30 is enabled to ascend and descend vertically relative to its conveying surface by a lift mechanism 34. As shown in FIGS. 3 and 4, a conveying position of the conveyor 30 for the battery containers 11 lies below the laser compartment 22 with a predetermined distance therefrom. When the conveyor 30 is in the conveying position, each battery container 11 sandwiched between the container support plates 33a and 33b is conveyed in such a manner that its top part is located below the tube 27.

The machining position of the conveyor 30 is assumed to be a position where the conveying surface raised from the conveying position closely contacts the lower end portion of the tube 27. In the present embodiment, two longitudinally adjacent pairs of battery containers 11, four containers in total, conveyed between the conveyor belts 32a and 32b are categorized as one group. The interval between each two adjacent groups is adjusted so that the other groups of battery containers 11 adjacent to the one group concerned cannot be located just below the laser compartment 22 when the battery containers 11 in the one group are carried into the opening of the tube 27. Thus, the conveyor 30 can ascend to the machining position when the battery containers 11 in the one group are carried into the opening of the tube 27. When the conveyor 30 reaches the machining position, the four battery containers 11 of the group concerned get into the tube 27. Moreover, the conveying surface of the conveyor 30 hermetically closes the lower-end opening of the tube 27.

The manufacturing apparatus 20 comprises a pair of wiper tools 40 and a sealer mounting tool 50.

As shown in FIGS. 4 and 5, the wiper tools 40 are arranged individually on the upstream and downstream sides with respect to battery conveying direction A along the conveyor 30 and opposed to each other. An upstream wiper tool 40a comprises a rotary shaft member 41 and two arms 42a and 42b. The rotary shaft member 41 is supported so that its central axis is directed at right angles to battery conveying direction A. The arms 42a and 42b are mounted parallel to each other on the rotary shaft member 41 in such a manner that they extend at right angles to the central axis of the shaft member 41. Likewise, a downstream wiper tool 40b comprises a rotary shaft member 43 and two arms 44a and 44b.

The rotary shaft member 43 is supported so that its central axis is directed at right angles to battery conveying direction A. The arms 44a and 44b are mounted parallel to each other on the rotary shaft member 43 in such a manner that they extend at right angles to the central axis of the shaft member 43. A wiping sponge 45 is attached to the distal end portion of each of the arms 42a, 42b, 44a and 44b.

When the upstream wiper tool 40a is in its standby position, the respective distal ends of the arms 42a and 42b are directed to the ceiling portion of the chamber 24, as indicated by a full line in FIG. 4. When the upstream wiper tool 40a rotates approximately 90° in battery conveying direction A about the rotary shaft member 41, as indicated by a two-dot chain line in FIG. 4, it reaches its wiping position. When the downstream wiper tool 40b is in its standby position, on the other hand, the respective distal ends of the arms 44a and 44b are directed to the ceiling portion of the chamber 24, as indicated by a full line in FIG. 4. When the downstream wiper tool 40b rotates approximately 90° in a direction opposite to battery conveying direction A about the rotary shaft member 43, as indicated by a two-dot chain line in FIG. 4, it reaches its wiping position.

When in the wiping position, the arms 42a, 42b, 44a and 44b of the wiper tools 40 wipe areas around the injection holes 17 formed in the respective sealing plates 11B of the four battery containers 11 in the tube 27 by means of the sponges 45.

As shown in FIGS. 3 to 5, the sealer mounting tool 50 comprises a rotary shaft member 51 and two arms 52a and 52b. The rotary shaft member 51 is supported so that its central axis extends along the conveyor 30. The arms 52a and 52b are mounted parallel to each other on the rotary shaft member 51 in such a manner that they extend at right angles to the central axis of the shaft member 51. Two sealer suckers 53 are secured to longitudinal middle portions of each of the arms 52a and 52b.

When the sealer mounting tool 50 is in its standby position, the sealer suckers 53 on each of the arms 52a and 52b are directed to the ceiling portion of the chamber 24, as indicated by a full line in FIG. 3. When the sealer mounting tool 50 rotates approximately 180° about the rotary shaft member 51, as indicated by a two-dot chain line in FIG. 3, it reaches its mounting position.

When in the standby position, the arms 52a and 52b of the sealer mounting tool 50 draw four sealers 19, which are simultaneously introduced by the sealer supply tool 70 (described later), by means of the sealer suckers 53. When the sealer mounting tool 50 is rotated by the rotary shaft member 51 and reaches the mounting position, thereafter, the four sealers 19 that are drawn to the sealer suckers 53 are mounted individually on the respective injection holes 17 of the four battery containers 11 in the tube 27.

A parts feeder 60 and sealer supply tool 70 are disposed in the body case 21 of the manufacturing apparatus 20. The parts feeder 60 introduces a large number of sealers 19 into the sealer supply tool 70.

As shown in FIGS. 3 and 5, the sealer supply tool 70 comprises a pair of arms 71a and 71b, left and right, a pair of Y-movement stages 72a and 72b, X-movement stage 73, and Z-movement cylinder 74. The arms 71a and 71b are attached to the distal ends of the Y-movement stages 72a and 72b, respectively.

The Y-movement stages 72a and 72b can advance and retreat at right angles to battery conveying direction A of the conveyor 30. The X-movement stage 73 is configured to slide the Y-movement stages 72a and 72b parallel to battery conveying direction A. The Z-movement cylinder 74 is configured to move the X-movement stage 73 and Y-movement stages 72a and 72b up and down.

As shown in FIG. 3, sealer suckers 75 are secured individually to two longitudinal portions of the lower surface of each of the arms 71a and 71b of the sealer supply tool 70. Thus, the total number of the sealer suckers 75 on the pair of arms 71a and 71b is four. The sealer suckers 75 can individually draw the sealers 19 introduced from the parts feeder 60.

The pair of arms 71a and 71b having the sealers 19 drawn individually to the sealer suckers 75 thereon get into the chamber 24 through the tool insertion slots 24c and 24 by the actions of the Y-movement stages 72a and 72b, X-movement cylinders 73, and Z-movement cylinders 74. Then, the four sealers 19 are delivered between the arms 52a and 52b of the sealer mounting tool 50 in the standby position in the chamber. On receiving the four sealers 19, the sealer mounting tool 50 mounts them individually on the respective injection holes 17 of the four battery containers 11 accommodated in the tube 27. The sealer supply tool 70 and sealer mounting tool 50 constitute sealer transfer unit.

The chamber 24 comprises an openable hatch on the side surface opposite to the surface on which the tool insertion slots 24c and 24d are formed. The maintenance of the interior of the chamber 24 can be performed when the hatch is opened.

Manufacturing processes for the sealed secondary battery 10 by means of the manufacturing apparatus 20 constructed in this manner will now be described with reference to FIGS. 6 to 9. Based on the configuration view of FIG. 3, FIGS. 6 to 9 schematically show states of the manufacturing apparatus 20 in main manufacturing processes.

The container body 11A, electrode assembly 13, and sealing plate 11B on which the electrode terminals 14 and 15 are mounted are prepared first. After the battery elements including the electrode assembly 13 are then arranged in the container body 11A, the sealing plate 11B is mounted on the end face of the opening of the container body 11A, and the entire periphery of the sealing plate 11B is welded to form the battery container 11. As this is done, the electrode assembly 13 is electrically connected to the electrode terminals 14 and 15.

Then, the non-aqueous electrolyte 12 is injected into the battery container 11 accommodating the electrode assembly 13 through the injection hole 17 in the sealing plate 11B. This injection is performed using, for example, an electrolyte injector under the atmospheric pressure. The electrolyte injector comprises a tank accommodating the electrolyte 12, a nozzle communicating with the tank, and a pump configured to internally pressurize the tank and deliver the electrolyte 12 through the nozzle. An injection port smaller than a hole portion 17c of the injection hole 17 is formed in the distal end of the nozzle. In starting the injection, the injection port of the nozzle is introduced through the injection hole 17, and the injection port and injection hole 17 are hermetically connected.

In this state, the pump is driven to pressurize the non-aqueous electrolyte 12 in the tank so that the electrolyte 12 is injected from the nozzle into the battery container 11 through the injection hole 17. After the electrolyte 12 is injected to a predetermined amount, the nozzle is removed from the injection hole 17.

After the electrode assembly 13 and non-aqueous electrolyte 12 are thus accommodated in the battery containers 11, the battery containers 11 are placed on the conveyor belts 32a and 32b and held by the container support plates 33a and 33b.

The battery containers 11 held by the container support plates 33a and 33b are conveyed in groups along the conveyor 30 to the manufacturing apparatus 20, each group including two longitudinally adjacent pairs of battery containers 11 (four in total) conveyed by the conveyor belts 32a and 32b.

Figure 6:
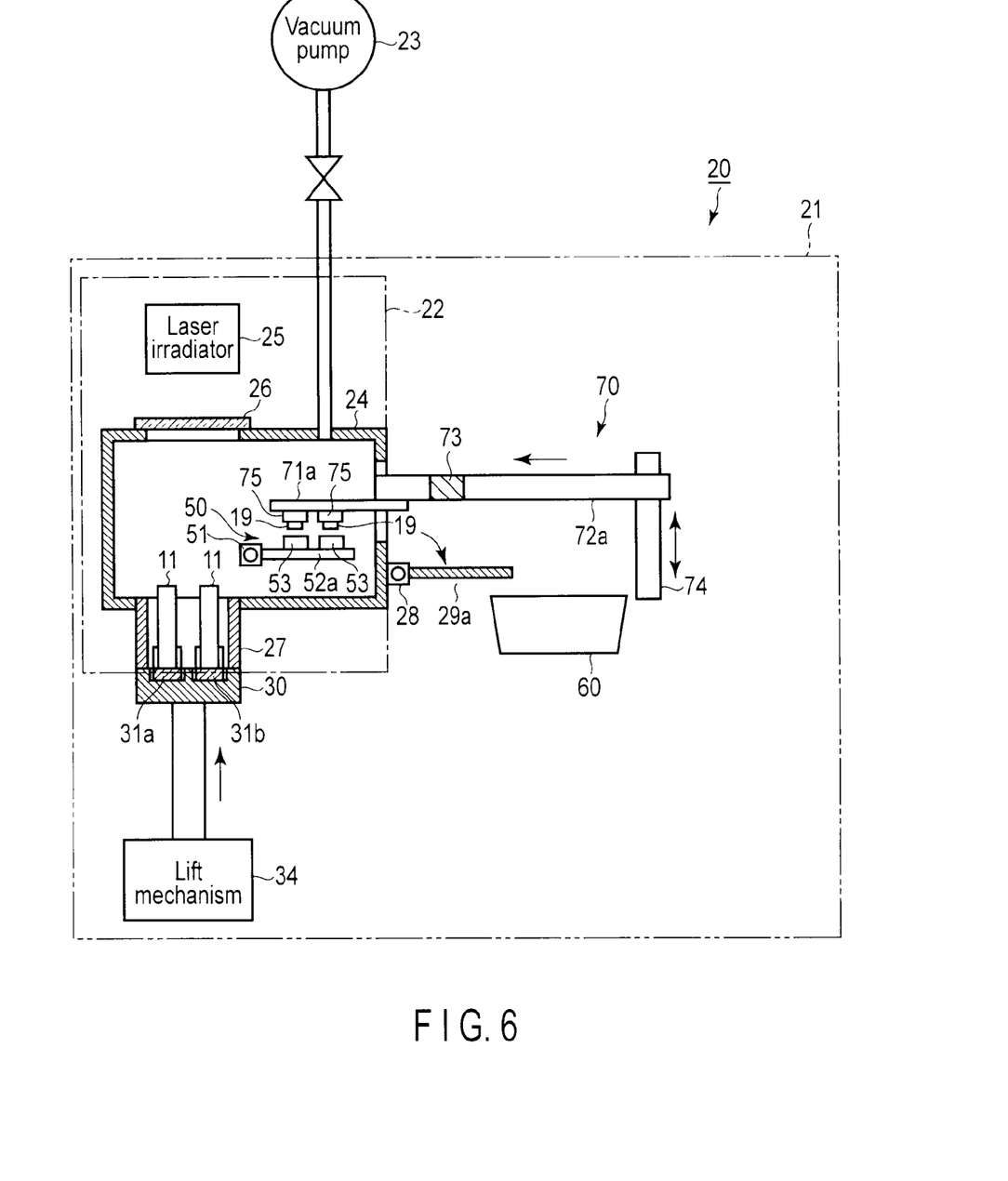
FIG. 6 is a view schematically showing a state of the manufacturing apparatus in a main process of a manufacturing method according to the first embodiment.
Figure 7:
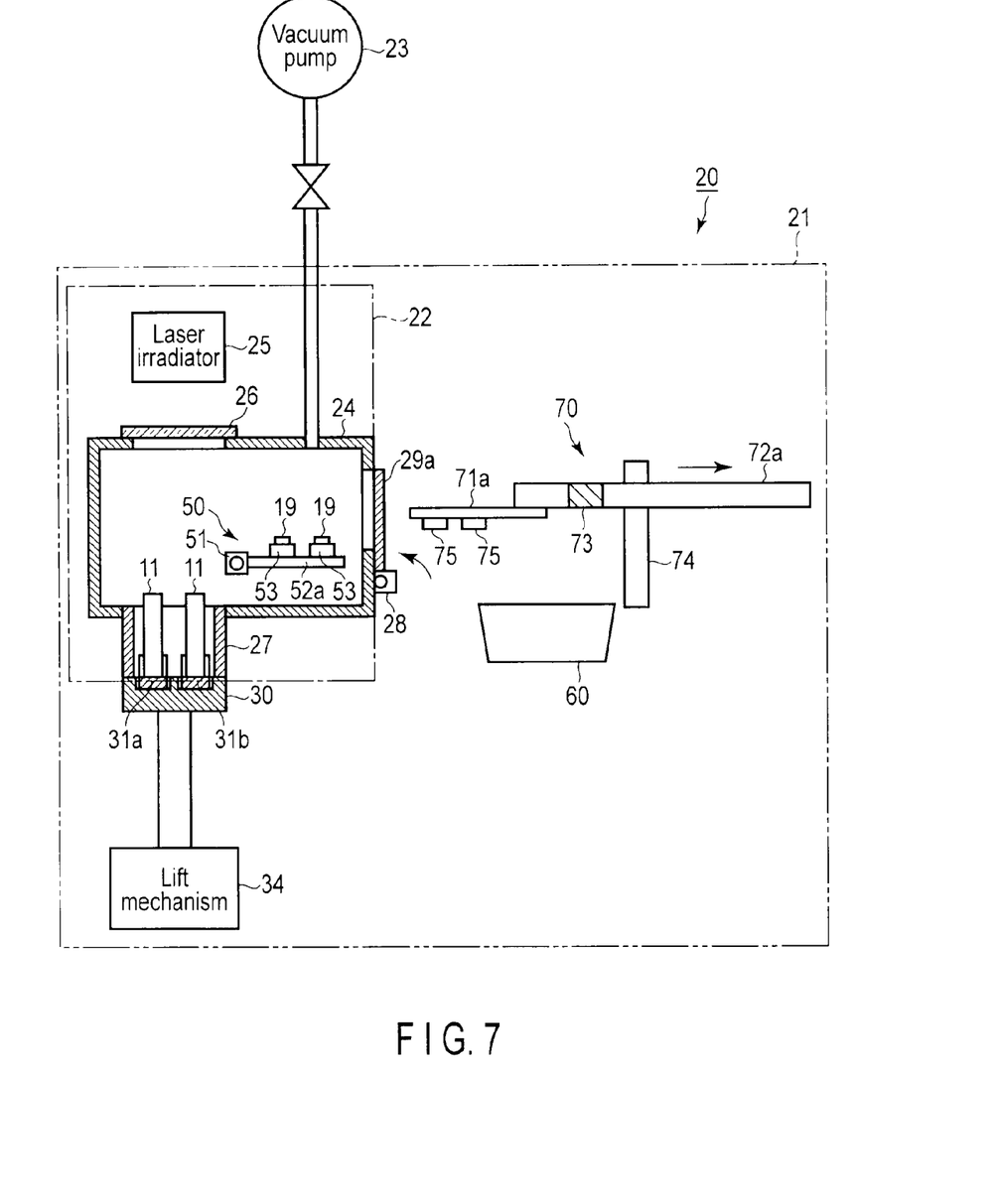
FIG. 7 is a view schematically showing a state of the manufacturing apparatus in another process of the manufacturing method.

When the four battery containers 11 in one group are conveyed into the opening of the tube 27, the manufacturing apparatus 20 suspends conveying operation. Then, the lift mechanism 34 is actuated to raise the conveyor 30, as shown in FIG. 6. When the conveyor 30 ascends to the machining position, the manufacturing apparatus 20 inactivates the lift mechanism 34.

As this is done, the four battery containers 11 get into the chamber 24 through a hollow of the tube 27 in the chamber 24. Further, the lower-end opening of the tube 27 is hermetically closed by the conveying surface of the conveyor 30. Thus, a process is realized for loading the battery containers 11, into which the electrolyte 12 is injected through the injection holes 17, into the chamber 24.

On the other hand, the manufacturing apparatus 20 rotates the rotary shaft member 28, thereby causing the doors 29a and 29b to open. Then, the manufacturing apparatus 20 controls the Y-movement stages 72a and 72b, X-movement stage 73, and Z-movement cylinder 74 of the sealer supply tool 70 to introduce the arms 71a and 71b into the chamber 24 through the tool insertion slots 24c and 24d. Before this is done, the sealers 19 introduced from the parts feeder 60 are previously drawn to the sealer suckers 75 on the arms 71a and 71b.

When the arms 71a and 71b introduced into the chamber 24 reach positions where they face the arms 52a and 52b, respectively, of the sealer mounting tool 50, as shown in FIG. 6, the manufacturing apparatus 20 cancels the drawing action of the sealer suckers 75. Thus, the four sealers 19 transferred by the sealer supply tool 70 are delivered and drawn to the sealer suckers 53 on the arms 52a and 52b of the sealer mounting tool 50.

Thereafter, the manufacturing apparatus 20 controls the sealer supply tool 70 for reversal, thereby allowing the arms 71a and 71b to get out of the chamber 24 through the tool insertion slots 24c and 24d, respectively. When the arms 71a and 71b get out of the chamber 24, the manufacturing apparatus 20 reversely rotates the rotary shaft member 28, thereby closing the doors 29a and 29b.

Thus, the chamber 24 is hermetically closed when the opening of the tube 27 is closed by the conveying surface of the conveyor 30 and the tool insertion slots 24c and 24d are closed by the doors 29a and 29b, respectively. If the chamber 24 is hermetically closed, the manufacturing apparatus 20 activates the vacuum pump 23. Then, the interior of the chamber 24 is decompressed to a pressure lower than the internal pressure of each battery container 11. Thus, a process is realized for decompressing the chamber 24 loaded with the battery containers 11 after hermetically closing the chamber.

If the decompression is performed, the electrolyte 12 may overflow the injection holes 17 of the battery containers 11, in some cases. When the decompression is finished, therefore, the manufacturing apparatus 20 rotates the rotary shaft members 41 and 43 of the two wiper tools 40a and 40b, thereby pivoting each of the arms 42a, 42b, 44a and 44b from the standby position to the wiping position. In this way, the electrolyte having overflowed the respective injection holes 17 of the battery containers 11 is wiped off by the corresponding sponges 45. Thus, a process is realized for wiping an area around the injection hole of each battery container 11.

In a predetermined time after the arms 42a, 42b, 44a and 44b are pivoted to the wiping position, the manufacturing apparatus 20 reverses the rotary shaft members 41 and 43, thereby restoring the arms 42a, 42b, 44a and 44b to the standby position.

Then, the manufacturing apparatus 20 drives the laser irradiator 25 to scan the periphery of the injection hole 17 of each battery container 11 with a laser beam. In this way, those portions of the electrolyte which have failed to be wiped off can be evaporated by laser radiation and further wiped off. The laser output for this purpose is just high enough to evaporate the electrolyte.

Figure 8:
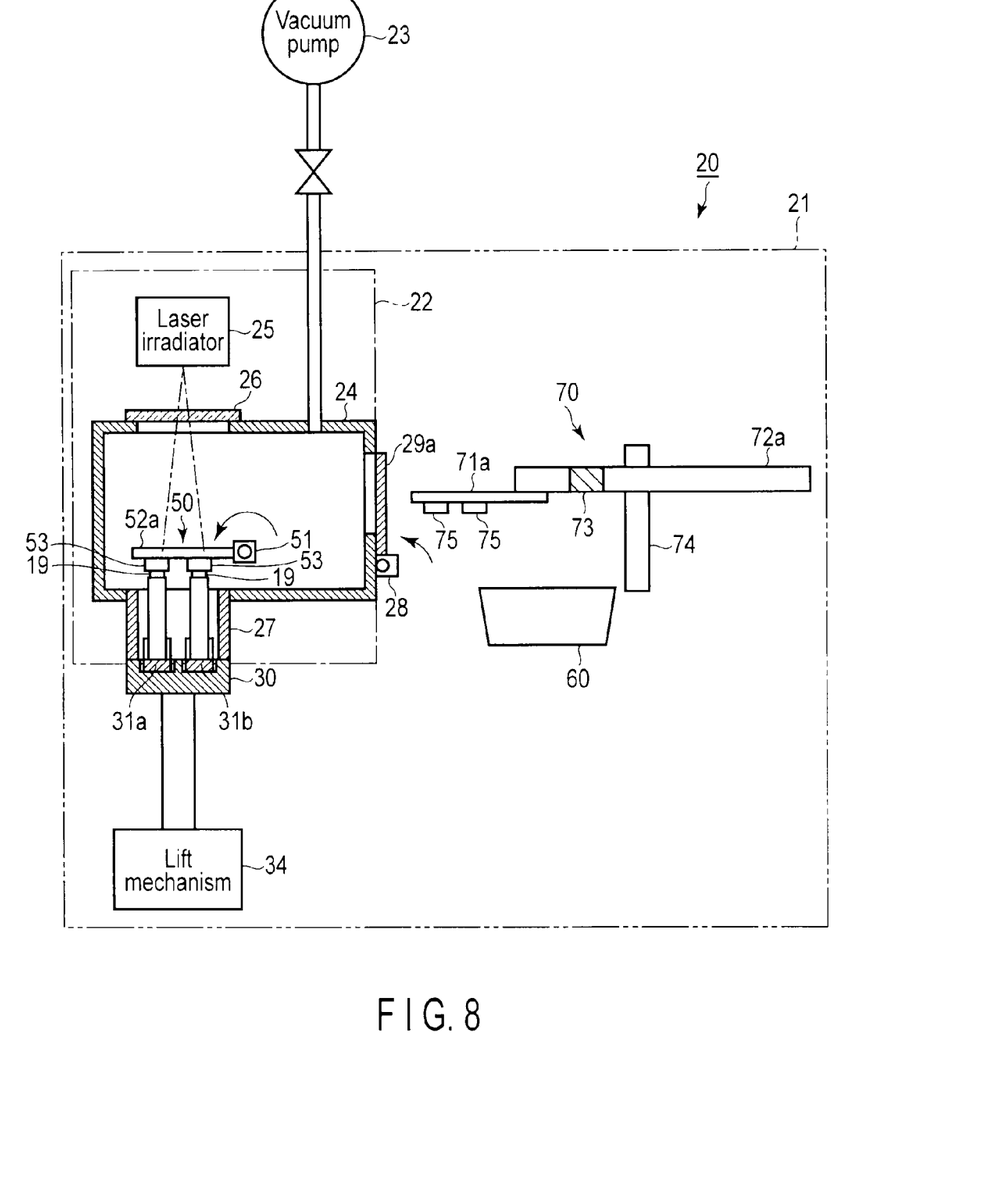
FIG. 8 is a view schematically showing a state of the manufacturing apparatus in another process of the manufacturing method.

Subsequently, as shown in FIG. 8, the manufacturing apparatus 20 rotates the rotary shaft member 51 of the sealer mounting tool 50 to pivot the arms 52a and 52b from the standby position to the mounting position. Thereupon, the four sealers 19 drawn to the sealer suckers 53 on the arms 52a and 52b are mounted individually on the injection holes 17 of the four battery containers 11 introduced into the chamber 24. Thus, a process is realized for mounting the sealers 19 for sealing the injection holes 17 of the battery containers 11 in the decompressed chamber 24 on the injection holes by means of the sealer mounting tool 50.

The manufacturing apparatus 20 drives the laser irradiator 25 for scanning with a laser beam in such a manner that the sealers 19 on the injection holes 17 are pressed by the arms 52a and 52b. In this cycle of laser beam scanning, the peripheral edge portion of each sealer 19 on the injection hole 17 of each battery container 11 is partially laser-welded to the sealing plate 11B. Thus, the manufacturing apparatus 20 partially tack-welds the peripheral edge portions of the sealers 19 on the injection holes 17 of the battery containers 11 with the sealers 19 pressed by the arms 52a and 52b of the sealer mounting tool 50.

Figure 9:
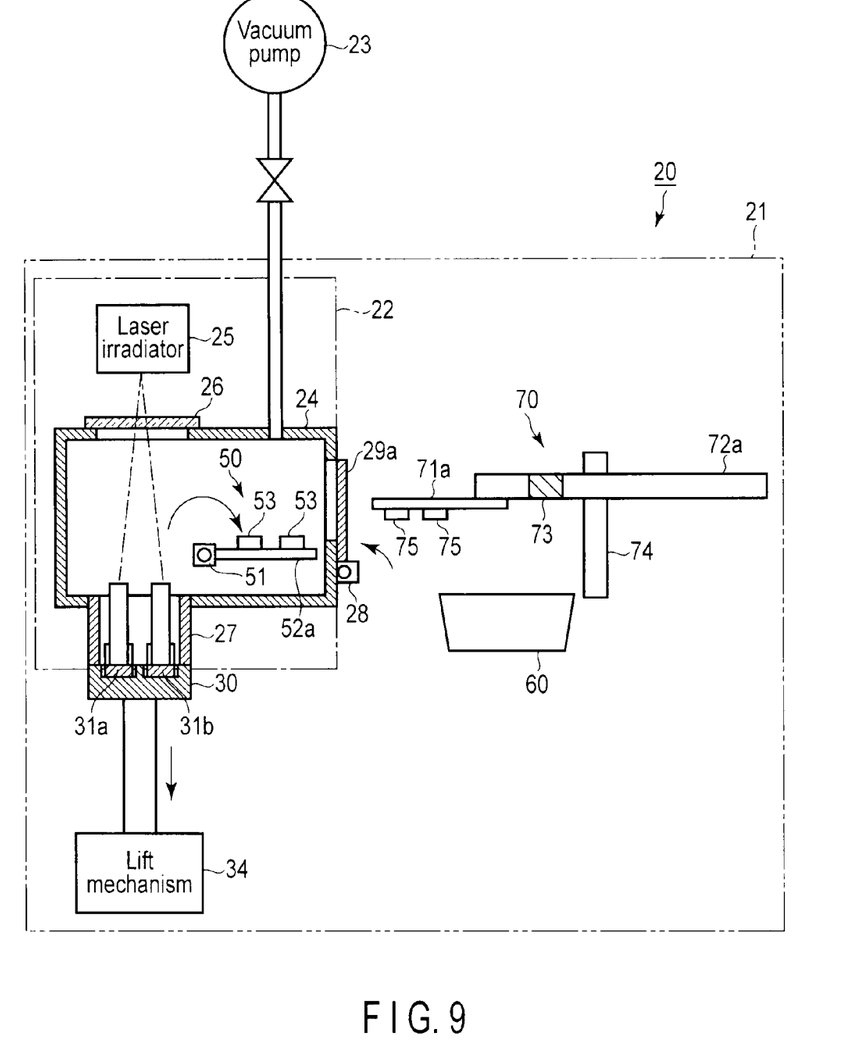
FIG. 9 is a view schematically showing a state of the manufacturing apparatus in another process of the manufacturing method.

When the tack welding is finished, the manufacturing apparatus 20 cancels the drawing action of the sealer suckers 53. Then, the rotary shaft member 51 is reversed to restore the arms 52a and 52b to the standby position, as shown in FIG. 9. Thereafter, the laser irradiator 25 is driven again to restart scanning with a laser beam. In this scanning cycle, the peripheral edge portion of each sealer 19 on the injection hole 17 of each battery container 11 is entirely laser-welded to the sealing plate 11B. Specifically, the manufacturing apparatus 20 finally welds the entire peripheries of the sealers 19 after the arms 52a and 52b of the sealer mounting tool 50 are retracted. In this way, the injection holes 17 are sealed. Thus, a process is realized for laser-welding the sealers 19 on the battery containers 11 to the containers by applying a laser beam to the peripheral edge portions of the containers 11 through the laser transmission window 26 in one surface of the chamber 24.

When the laser welding is finished, the manufacturing apparatus 20 drives the lift mechanism 34 to lower the conveyor 30. When the conveyor 30 descends to the conveying position, the manufacturing apparatus 20 resumes the conveying operation. When the four battery containers 11 in the adjacent groups are then conveyed into the opening of the tube 27, the manufacturing apparatus 20 suspends the conveying operation and repeats the same processes as described above.

Thus, in the manufacturing apparatus 20 of the present embodiment, each sealer 19 is mounted under reduced pressure on the injection hole 17 of each battery container 11 injected with the electrolyte, and the peripheral edge portion of the sealer 19 is directly laser-welded to seal the injection hole 17. Since the injection hole 17 is not sealed by press-fitting an elastic projection, therefore, defects in laser welding, if any, can be reliably detected in a post-welding leak test.

In the manufacturing apparatus 20, moreover, the wiper tools 40 are arranged in the chamber 24 so that they can wipe the areas around the injection holes 17 before the sealers 19 are mounted even when the electrolyte 12 overflows the holes 17 as the battery containers 11 are decompressed. Further, those portions of the electrolyte which have failed to be wiped off by laser radiation are evaporated after the surrounding areas are wiped by the wiper tools 40a and 40b. Thus, the electrolyte 12 having overflowed the injection holes 17 can be prevented from causing welding failure.

Second Embodiment

A second embodiment will now be described with reference to FIGS. 10 and 11. The second embodiment is based on an improvement of the configuration of the vicinity of the laser transmission window 26 of the manufacturing apparatus 20 according to the first embodiment.

Figure 10:
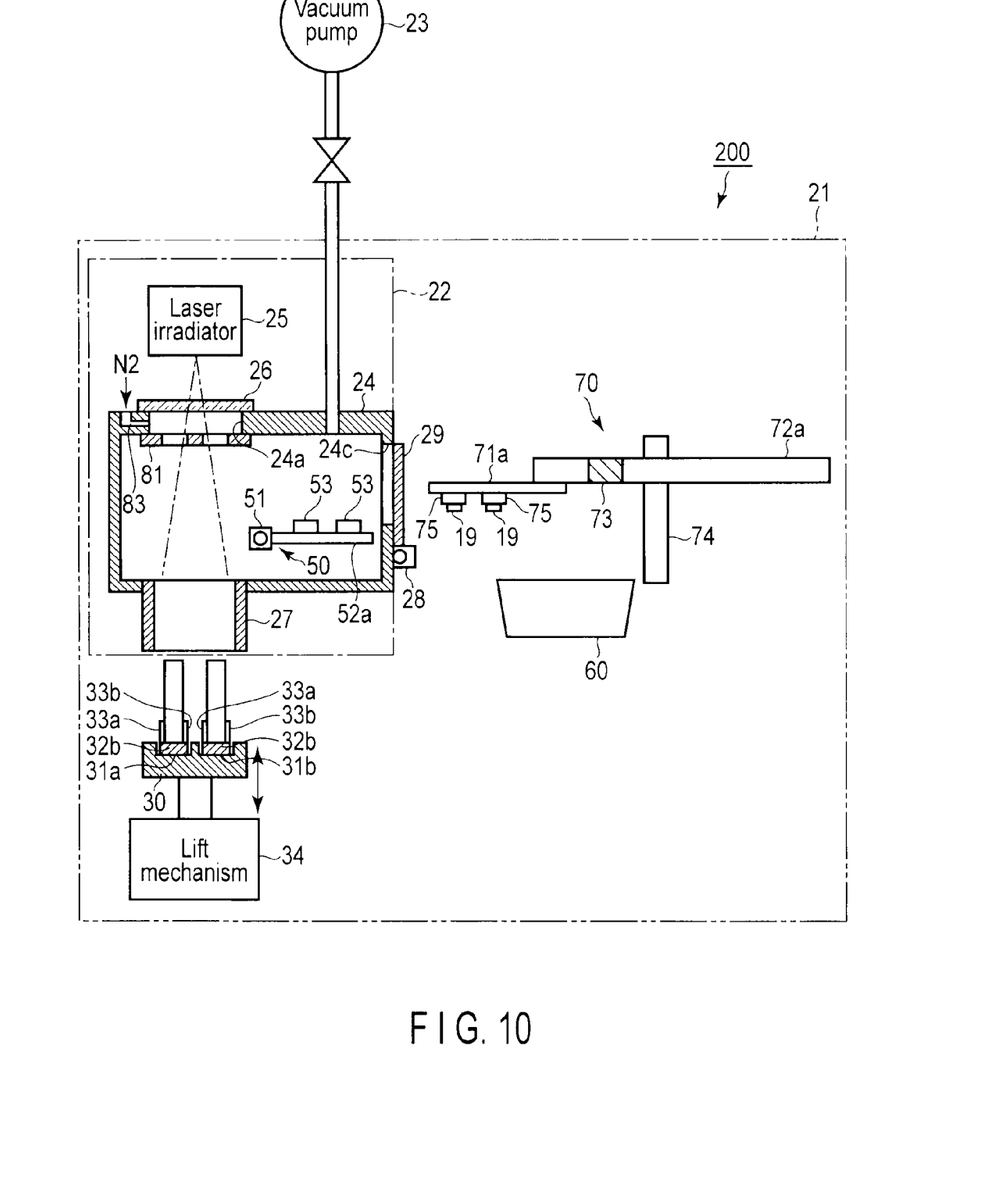
FIG. 10 is a schematic configuration view, partially in section, of a principal part of a manufacturing apparatus according to a second embodiment taken from the front side.
Figure 11:
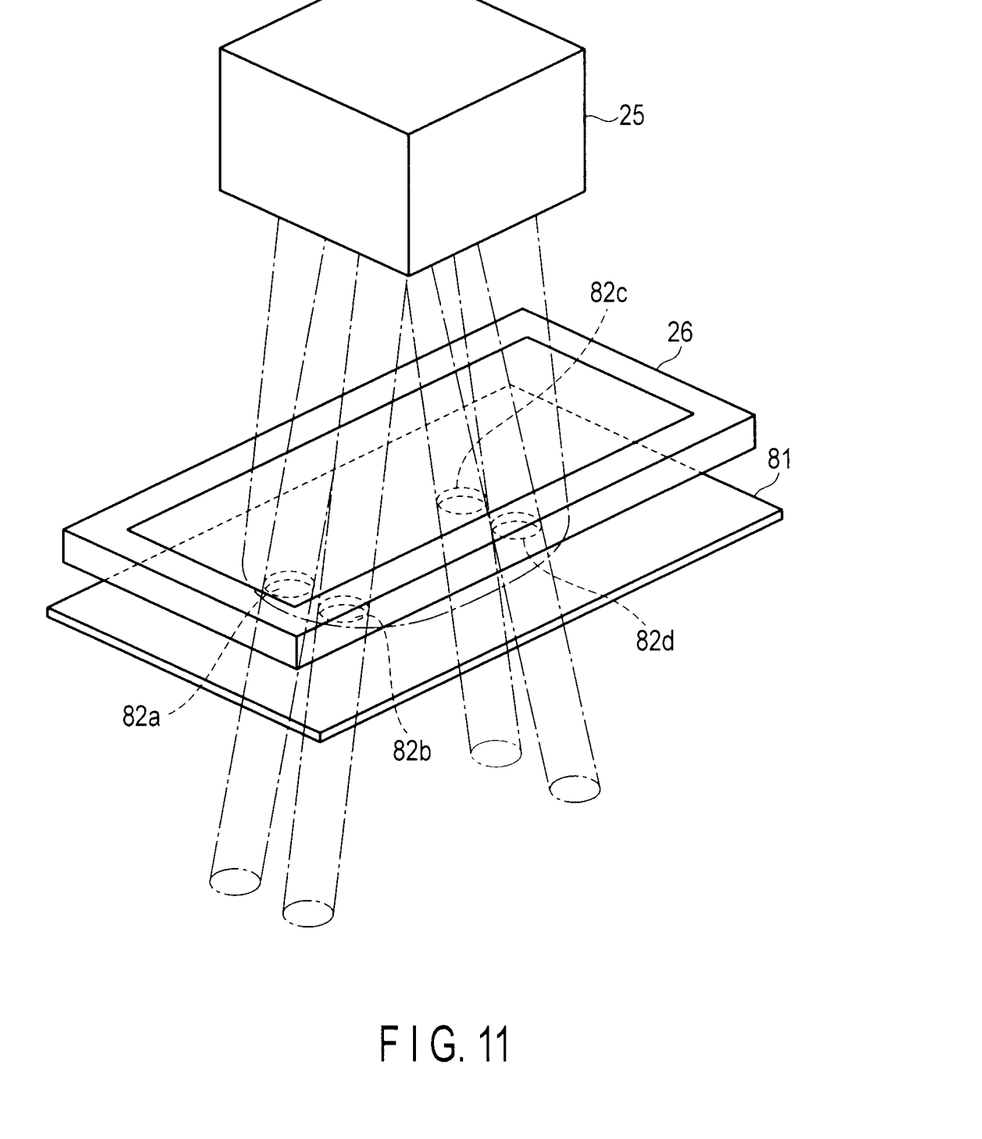
FIG. 11 is a perspective view schematically showing the principal part of the manufacturing apparatus of the second embodiment.

FIG. 10 is a schematic configuration view, partially in section, of a principal part of a manufacturing apparatus 200 of a second embodiment taken from the front side. Like numbers are used to designate common portions shown in FIG. 3, and a detailed description of those portions is omitted.

In the manufacturing apparatus 200, a protective plate 81 is secured to the inside of a laser transmission window 26, which hermetically closes an opening 24a in a ceiling portion of a chamber 24. The protective plate 81 is a flat plate of substantially the same size as the window 26. As shown in FIG. 11, four holes 82a to 82d are bored through the protective plate 81. Laser beams emitted from a laser irradiator 25 and transmitted through the laser transmission window 26 pass through the holes 82a to 82d, individually. The laser beams having passed through these holes 82a to 82d serve to weld the peripheral edge portions of the sealers 19 mounted individually on the injection holes 17 of the four battery containers 11 in the machining position in the chamber 24.

In the manufacturing apparatus 200, moreover, the chamber 24 is formed with a passage 83, which internally connects the internal space of a laser compartment 22 and a gap between the laser transmission window 26 and protective plate 81 secured with the opening 24a between them. Nitrogen, an inert gas in the laser compartment 22, is introduced through the passage 83 into the gap between the laser transmission window 26 and protective plate 81.

The manufacturing apparatus 200 shares other configurations with the manufacturing apparatus 20 of the first embodiment. Further, a manufacturing method for a sealed secondary battery 10 using the manufacturing apparatus 200 is the same as that of the first embodiment.

In the manufacturing apparatus 20 of the first embodiment, a laser beam from the laser irradiator 25 is applied to weld the peripheral edge portion of each sealer 19 in the machining position in the chamber 24. Since the interior of the chamber 24 is decompressed when this is done, a considerable amount of metal vapor is produced, so that the laser transmission window 26 may become foggy and exhibit reduced laser transmittance. If the laser transmittance is reduced, welding failure may occur.

In the manufacturing apparatus 200 of the second embodiment, in contrast, a laser beam from the laser irradiator 25 is applied in such a manner that gaseous nitrogen is introduced through the passage 83 into the gap between the laser transmission window 26 and protective plate 81. Thereupon, the pressure in the gap between the laser transmission window 26 and protective plate 81 becomes positive compared with an atmosphere in the chamber 24, so that the gaseous nitrogen jets out into the chamber 24 through the holes 82a to 82d. Even if metal vapor is produced by laser welding, therefore, it does not reach the laser transmission window 26, so that the window 26 can be prevented from becoming foggy. Consequently, the occurrence of welding failure due to a reduction in laser transmittance can be minimized.

The following is a description of a modification of the embodiment described above.

In the foregoing embodiments, for example, the entire conveyor 30 has been described as being configured to be raised and lowered by the lift mechanism 34. Alternatively, however, the conveyor 30 may be divided into blocks that each hold four battery containers 11 in one group. When the battery containers 11 of this group are conveyed into the opening of the tube 27, in this case, only the blocks that hold these battery containers are raised and lowered by the lift mechanism 34. In this way, the interval between each two longitudinally adjacent groups of battery containers 11 can be reduced.

In the foregoing embodiments, moreover, the conveyor belts 32a and 32b are laid individually on the recessed grooves 31a and 31b of the conveyor 30, whereby the battery containers 11 are conveyed. However, conveying unit for the battery containers 11 is not limited to this arrangement.

Figure 12:
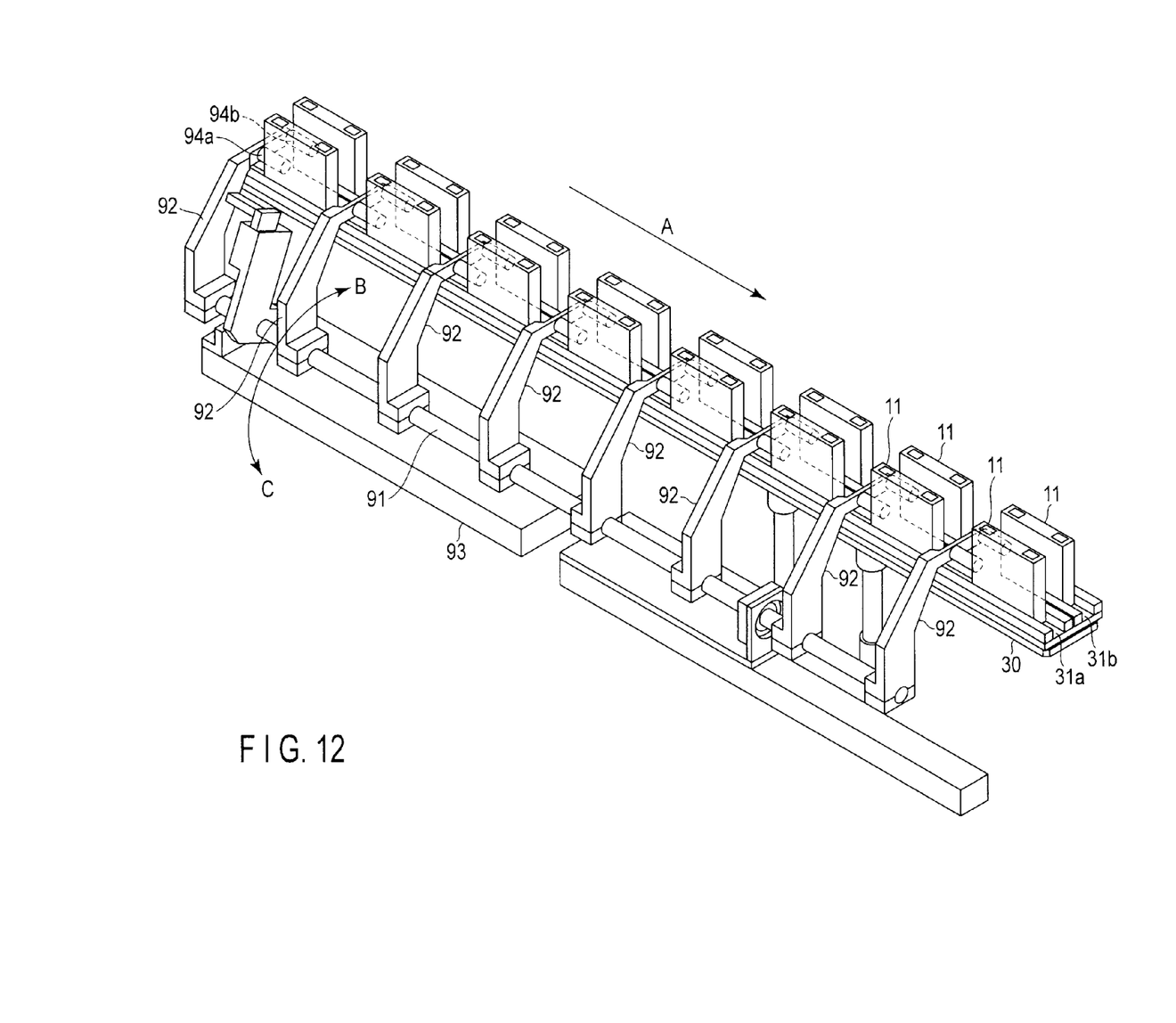
FIG. 12 is a perspective view showing a modification of a conveyor for conveying battery containers.

A modification of conveying unit will be described with reference to the perspective view of FIG. 12. In the example of FIG. 12, no conveyor belts are laid on recessed grooves 31a and 31b of the conveyor 30. Instead, the conveying unit of this modification comprises a rotary shaft member 91, a plurality of arm members 92, and actuator 93. The rotary shaft member 91 is supported so that its central axis extends along the length of the conveyor 30. The respective proximal ends of the arm members 92 are secured to the rotary shaft member 91 so that they are arranged at regular intervals along the axis of the shaft member 91. The actuator 93 drives the rotary shaft member 91 and arm members 92 to advance and retreat a predetermined distance along the axis of the shaft member 91. A pair of protrusions 94a and 94b are attached to the distal end of each arm member 92. The protrusions 94a and 94b serve to press each two battery containers 11 that are mounted standing in the recessed grooves 31a and 31b with their respective sealing plates 11B upward.

Each arm member 92 turns in the direction of arrow B or C in FIG. 12 as the rotary shaft member 91 rotates forward or reversely. By the action of the actuator 93, moreover, each arm member 92, along with the rotary shaft member 91, advances or retreats in the direction of arrow A or in the opposite direction.

If the battery containers 11 in the recessed grooves 31a and 31b of the conveyor 30 are conveyed in the direction of arrow A in FIG. 12, in the arrangement described above, the rotary shaft member 91 first rotates forward. Thereupon, each arm member 92 turns in the direction of arrow B so that its distal end is introduced between the battery containers 11 arrayed in a pair along the length of conveyor 30.

Then, the actuator 93 rotates forward. Thereupon, each arm member 92 advances in the direction of arrow A. Consequently, the respective distal ends of the protrusions 94a and 94b contact and press the battery containers 11 in the recessed grooves 31a and 31b, thereby delivering them in the direction of arrow A along the conveyor 30.

If each battery container 11 is delivered to a certain extent, the actuator 93 is stopped temporarily, and the rotary shaft member 91 rotates reversely. Thereupon, each arm member 92 turns in the direction of arrow C, so that protrusions 94a and 94b on its distal end are removed from between the battery containers 11.

Subsequently, the actuator 93 acts reversely, whereupon each arm member 92 retreats in the direction opposite to the direction of arrow A. The actuator 93 stops if each arm member 92 is retreated the same distance as its advance stroke.

Thereafter, the rotary shaft member 91 rotates forward again, and the same control as described above is repeated. Consequently, each battery container 11 advances the same distance on each occasion. Therefore, the position of each battery container 11 on the conveyor 30 is self-evident. Thus, according to the configuration shown in FIG. 12, each battery container 11 can be reliably positioned as it is conveyed. In consequence, each four battery containers 11 can be easily located in the chamber 24 and also positioned in the subsequent processes.

According to the embodiments described above, moreover, each four battery containers 11 are handled as a group, and the sealers 19 mounted individually on these battery containers are simultaneously laser-welded. However, the number of battery containers in each group to be simultaneously welded is not limited to four, and may alternatively be two, three, or five or more. The present invention is also applicable to sequential laser welding for individual battery containers.

Further, each sealer 19 is not limited to a disk shape and may be of any shape that enables the injection hole 17 to be sealed in such a manner that its peripheral edge portion is laser-welded to the sealing plate 11B.

Furthermore, the opening 24a in the ceiling portion is not limited to a rectangular shape. In short, the opening 24a should only be shaped so that a laser beam emitted from the laser irradiator 25 can be transmitted through it to weld the respective peripheral edge portions of the sealers 19 on the battery containers 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing apparatus for a sealed secondary battery, comprising:
   a chamber which accommodates therein a battery container injected with an electrolyte through an injection hole and is hermetically closed;
   a pressure reduction unit for reducing pressure inside the chamber;
   a sealer transfer unit configured to position and mount a sealer having a plate peripheral edge portion on the injection hole of the battery container in the chamber decompressed by the pressure reduction unit and maintain the sealer at a mount state in the chamber; and
   a welding unit configured to laser-weld the sealer maintained at the mount state to the battery container under a reduced pressure by applying a laser beam from outside the chamber to the peripheral edge portion of the sealer through a laser transmission region formed in one surface of the chamber,
   wherein the injection hole of the battery container is sealed by said laser-welding the sealer to the battery container.

2. The manufacturing apparatus for a sealed secondary battery of claim 1, wherein the sealer transfer unit comprises a sealer supply tool which externally introduces the sealer into the chamber and a sealer mounting tool which receives the sealer introduced into the chamber by the sealer supply tool and mounts the sealer on the injection hole of the battery container.

3. The manufacturing apparatus for a sealed secondary battery of claim 1, wherein the chamber has a dual structure such that a protective plate bored with a through-hole in a portion thereof through which the laser beam passes is disposed inside the laser transmission window and introduces an inert gas into a gap between the laser transmission window and the protective plate.

4. The manufacturing apparatus for a sealed secondary battery of claim 1, wherein
   the battery container comprises a container body with an opening at its top and a sealing plate to seal the opening, wherein the injection hole extends through the sealing plate and the sealing plate comprises an annular step portion around the injection hole, and
   the sealer is configured to fit in the step portion when mounted on the injection hole by the sealer transfer unit.

* * * * *